United States Patent
Oh et al.

(10) Patent No.: US 9,152,772 B2
(45) Date of Patent: Oct. 6, 2015

(54) DEVICE AND PORTABLE STORAGE DEVICE WHICH ARE CAPABLE OF TRANSFERRING RIGHTS OBJECT, AND A METHOD OF TRANSFERRING RIGHTS OBJECT

(71) Applicant: SAMSUNG ELECTRONICS CO., LTD., Gyeonggi-do (KR)

(72) Inventors: Yun-Sang Oh, Seoul (KR); Sang-Gyoo Sim, Suwon-si (KR); Yeo-Jin Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/169,190

(22) Filed: Jan. 31, 2014

(65) Prior Publication Data

US 2014/0150112 A1    May 29, 2014

Related U.S. Application Data

(62) Division of application No. 11/947,149, filed on Nov. 29, 2007, now Pat. No. 8,661,430.

(60) Provisional application No. 60/861,433, filed on Nov. 29, 2006.

(30) Foreign Application Priority Data

Mar. 27, 2007    (KR) .......................... 10-2007-0030005

(51) Int. Cl.
*G06F 9/44*     (2006.01)
*G06F 21/10*    (2013.01)
(Continued)

(52) U.S. Cl.
CPC .............. *G06F 21/105* (2013.01); *G06F 21/10* (2013.01); *G06F 21/606* (2013.01);
(Continued)

(58) Field of Classification Search
None
See application file for complete search history.

(56) References Cited

U.S. PATENT DOCUMENTS 5,159,597 A   10/1992  Monahan et al.
6,122,752 A    9/2000  Farah
(Continued)

FOREIGN PATENT DOCUMENTS

CN         1609749 A       4/2005
KR  10-2005-0096796 A    10/2005
(Continued)

OTHER PUBLICATIONS

Communication, dated Aug. 5, 2013, issued by the European Patent Office in counterpart European Patent Application No. 07834343.1.
(Continued)

*Primary Examiner* — Chameli Das
(74) *Attorney, Agent, or Firm* — Sughrue Mion, PLLC

(57) ABSTRACT

A device and a portable storage device which are capable of transferring a rights object (RO) and a method of transferring an RO are provided. The method includes enabling a device to transmit an installation request message to a portable storage device for installing a copy of an original RO present in the device in the portable storage device, enabling the device to install the copy of the original RO in the portable storage device, and enabling the device to receive an installation response message indicating that the copy of the original RO has been successfully installed in the portable storage device from the portable storage device.

9 Claims, 12 Drawing Sheets

(51) Int. Cl.
  *H04L 29/06* (2006.01)
  *G06F 21/60* (2013.01)
  *H04L 9/32* (2006.01)

(52) U.S. Cl.
  CPC ......... *H04L 9/3263* (2013.01); *H04L 63/0823* (2013.01); *G06F 2221/0737* (2013.01); *G06F 2221/2101* (2013.01); *G06F 2221/2103* (2013.01); *G06F 2221/2105* (2013.01); *G06F 2221/2107* (2013.01); *G06F 2221/2143* (2013.01); *H04L 2209/34* (2013.01); *H04L 2209/603* (2013.01)

(56) References Cited

U.S. PATENT DOCUMENTS

| | | | |
|---|---|---|---|
| 6,697,944 | B1 | 2/2004 | Jones et al. |
| 7,861,106 | B2 | 12/2010 | Avizienis |
| 7,870,397 | B2 | 1/2011 | Lee et al. |
| 8,176,322 | B2 | 5/2012 | Lee et al. |
| 2003/0048907 | A1 | 3/2003 | Nakahara et al. |
| 2005/0021497 | A1 | 1/2005 | Kohno |
| 2005/0044451 | A1 | 2/2005 | Fry et al. |
| 2005/0071801 | A1* | 3/2005 | Jesse et al. ............ 717/100 |
| 2005/0071803 | A1* | 3/2005 | Cherdron et al. ........ 717/101 |
| 2005/0091508 | A1 | 4/2005 | Lee et al. |
| 2005/0210249 | A1* | 9/2005 | Lee et al. ................ 713/168 |
| 2005/0216419 | A1 | 9/2005 | Lee et al. |
| 2005/0216739 | A1 | 9/2005 | Lee et al. |
| 2005/0268098 | A1 | 12/2005 | Oh et al. |
| 2005/0273644 | A1* | 12/2005 | Herley et al. ............ 714/2 |
| 2006/0031164 | A1 | 2/2006 | Kim |
| 2006/0069926 | A1* | 3/2006 | Ginter et al. ............ 713/194 |
| 2006/0155650 | A1 | 7/2006 | Oh et al. |
| 2006/0156413 | A1 | 7/2006 | Oh et al. |
| 2007/0050519 | A1 | 3/2007 | Cano et al. |
| 2007/0266441 | A1 | 11/2007 | Kim et al. |
| 2008/0040618 | A1* | 2/2008 | Andersson et al. ....... 713/193 |
| 2009/0217036 | A1* | 8/2009 | Irwin et al. ............. 713/168 |
| 2010/0017887 | A1* | 1/2010 | Kiyosawa et al. ........ 726/26 |
| 2010/0212022 | A1* | 8/2010 | Greevenbosch et al. ... 726/27 |
| 2012/0060225 | A1* | 3/2012 | Chu et al. .............. 726/26 |
| 2012/0167039 | A1* | 6/2012 | Williams et al. ......... 717/107 |
| 2014/0270161 | A1* | 9/2014 | Shamsaasef et al. ...... 380/44 |

FOREIGN PATENT DOCUMENTS

| | | |
|---|---|---|
| KR | 10-2005-0114156 A | 12/2005 |
| KR | 10-2006-0011760 A | 2/2006 |
| KR | 10-2006-0082807 A | 7/2006 |
| KR | 10-2007-0021033 A | 2/2007 |
| WO | 2006/123280 A2 | 11/2006 |

OTHER PUBLICATIONS

Office Action issued May 25, 2011 in counterpart Chinese Application No. 200780044126.7.
Cavarero et al., "How to design the right object classes", IEEE, 1993.
Yoon, Eun-Jun, "Efficient OMA DRM v2.0 ROAD for Protecting a Rights Object for a Device", IEEE, 2008.

* cited by examiner

FIG. 7

```
DeviceTraceRecord() {
    srmID          160    bslbf
    roIDLength      16    uimsbf
        for ( i=0 ; i < roIDLength ; i++ ) {
            byte     8      bslbf
        }
    functionID      16    bslbf
    stepIndex        8    uimsbf
}
```

702 — srmID
704 — roIDLength
706 — byte
708 — functionID
710 — stepIndex

FIG. 8

```
SrmTraceRecord() {
    deviceID              160    bslbf
    roIDLength            16     uimsbf
        for ( i=0 ; i < roIDLength ; i++ ) {
            byte          8      bslbf
        }
    functionID            16     bslbf
    stepIndex             8      uimsbf
}
```

- 802 — deviceID
- 804 — roIDLength
- 806 — byte
- 808 — functionID
- 810 — stepIndex

DEVICE AND PORTABLE STORAGE DEVICE WHICH ARE CAPABLE OF TRANSFERRING RIGHTS OBJECT, AND A METHOD OF TRANSFERRING RIGHTS OBJECT

CROSS REFERENCE TO RELATED APPLICATIONS

This is a Divisional application of U.S. application Ser. No. 11/947,149 filed Nov. 29, 2007, which claims priority from Korean Patent Application No. 10-2007-0030005 filed on Mar. 27, 2007 in the Korean Intellectual Property Office and U.S. Provisional Patent Application No. 60/861,433 filed on Nov. 29, 2006 the disclosures of which are incorporated herein by reference in its entirety.

BACKGROUND OF THE INVENTION

1. Field of the Invention

Methods and apparatuses consistent with the present invention relate to a device and a portable storage device which are capable of transferring a rights object (RO) which can guarantee a safe transfer of the RO between a device and a portable storage device.

2. Description of the Related Art

In recent years, research has been vigorously conducted on Digital Rights Management (DRM), which is a technology for protecting digital content that can be easily copied and distributed, and various services adopting DRM technology have been or are currently being commercialized. Digital data, unlike analog data, can be copied without causing any data loss, and it is easy to recycle, process, and distribute digital data compared to analog data. It is also possible to copy and distribute digital data at a low cost. However, the creation of digital content is costly, and time-consuming, and thus requires various techniques for protecting digital copyrights. Against this backdrop, the range of application of DRM has extended.

Related art techniques for protecting digital content generally focus on the prevention of illegitimate access to digital content. Therefore, only users who have paid fees for digital content are allowed to access the digital content, whereas users who have not paid any fees for the digital content are not allowed to access the digital content. However, if an authorized user who has paid fees for digital content and can thus legitimately access the digital content distributes the digital content to an unauthorized third person, the unauthorized third person may be able to consume the digital content without the need to pay any fees for the digital content, thereby causing a number of problems.

DRM basically allows unlimited access to digital content. However, DRM encrypts digital content and requires a predetermined license for the execution of such encrypted digital content, thereby assuring an effective protection of digital content.

FIG. 1 illustrates the concept of typical DRM. DRM mainly involves the protection of content using an encryption or scramble method and the management of a license necessary for accessing encrypted content.

FIG. 1 illustrates device A (10) and device B (50) which wish to access encrypted content, a content provider 20 which provides content, a rights object (RO) issuer (RI) 30 which issues an RO including a license necessary for executing content, and a certificate issuer 40 which issues a certificate.

Device A (10) may obtain encrypted content from the content provider 20. Thereafter, device A (10) may purchase an RO including a license necessary for the use of the encrypted content from the RI 30. Once the RO corresponding to the encrypted content is obtained, device A (10) may use the encrypted content.

Since the encrypted content can be freely distributed, device A (10) may freely transmit the encrypted content to device B (50). In order to reproduce the encrypted content, device B (50) also needs the RO corresponding to the encrypted content. Device B (50) may obtain the RO corresponding to the encrypted content from the RI 30.

The certificate issuer 40 issues a certificate including the name of an authorized device whose public key has been identified, a serial number of the certificate, the name of the certificate issuer 40, the public key of the authorized device, and a message indicating the expiration date of the certificate. A first device may determine whether a second device currently communicating with the first device is an authorized device based on a certificate, if any, issued to the second device by the certificate issuer 40.

However, no appropriate methods of transferring and copying an RO from a device to a portable storage device or vice versa and taking appropriate measures to deal with errors that may occur during the transfer and copy of an RO have been suggested.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a device and a portable storage device which are capable of transferring an RO, and a method of transferring an RO which can guarantee a safe transfer of an RO between a device and a portable storage device.

However, the objectives of the present invention are not restricted to the one set forth herein. The above and other aspects of the present invention will become more apparent to one of ordinary skill in the art to which the present invention pertains by referencing a detailed description of the present invention given below.

According to an aspect of the present invention, there is provided a method of transferring an RO from a device to a portable storage device, the method including enabling a device to transmit an installation request message to a portable storage device in order to install a copy of an original RO present in the device in the portable storage device, enabling the device to install the copy of the original RO in the portable storage device and enabling the device to receive an installation response message indicating that the copy of the RO has been successfully installed in the portable storage device from the portable storage device.

According to another aspect of the present invention, there is provided a method of withdrawing a copy of an RO from a portable storage device and transmitting the withdrawn copy of the RO to a device, the method including enabling a device to transmit a withdrawal request message to a portable storage device in order to withdraw a copy of an RO present in the portable storage device and then install the copy of theRO in the device, enabling the device to receive the copy of the RO from the portable storage device, enabling the device to install the copy of the RO in the device, enabling the device to transmit a deletion request message to the portable storage device in order to delete the original RO from the portable storage device, and enabling the device to receive a deletion response message regarding the deletion of the original RO from the portable storage device.

According to another aspect of the present invention, there is provided a method of utilizing an RO, which is performed by a device, the method including enabling a first module in a device to select an RO to be utilized in connection with the use of DRM content from among a plurality of ROs received from a portable storage device, and enabling the first module to transmit a lock request message to the portable storage device in order to lock an original RO in the portable storage device corresponding to the selected RO so that the original RO corresponding to the selected RO cannot be used by a module other than the first module.

According to another aspect of the present invention, there is provided a method of installing an RO in a portable storage device, the method comprising enabling a portable storage device to receive an installation request message from a device in order to install a copy of an original RO which is present in the device into the portable storage device, enabling the portable storage device to install the copy of the original RO if integrity of the installation request message is verified, and enabling the portable storage device to transmit an installation response message regarding the installation of the copy of the RO to the device.

According to another aspect of the present invention, there is provided a method of transmitting an RO between a portable storage device and a device, the method comprising enabling a portable storage device to receive a withdrawal request message regarding an RO present in the portable storage device from a device, enabling the portable storage device to withdraw a copy of the RO, enabling the portable storage device to transmit the copy of the RO to the device, and enabling the portable storage device to recover an error that has occurred during a predetermined operation performed between the device and the portable storage device.

According to another aspect of the present invention, there is provided a device capable of transferring an RO, the device comprising a transmission and reception module which transmits and receives messages for transferring an RO to be utilized in connection with the transmission of content between the device and a portable storage device and a recovery module which recovers an error that has occurred during the transfer of the RO between the device and the portable storage device in response to the messages.

According to another aspect of the present invention, there is provided a portable storage device capable of transferring an RO, the portable storage device including a processing module which performs an operation corresponding to a request message transmitted by a device, where the request message is regarding the transfer of an RO to be utilized in connection with access of content and a recovery module which recovers an error that has occurred during the transfer of the RO between the device and the portable storage device.

BRIEF DESCRIPTION OF THE DRAWINGS

The above and other aspects of the present invention will become more apparent by describing in detail exemplary embodiments thereof with reference to the attached drawings in which:

FIG. 7 illustrates the format of a device trace record according to an exemplary embodiment of the present invention;

FIG. 8 illustrates the format of an SRM trace record according to an exemplary embodiment of the present invention;

DETAILED DESCRIPTION OF EXEMPLARY EMBODIMENTS OF THE INVENTION

Figure 1:
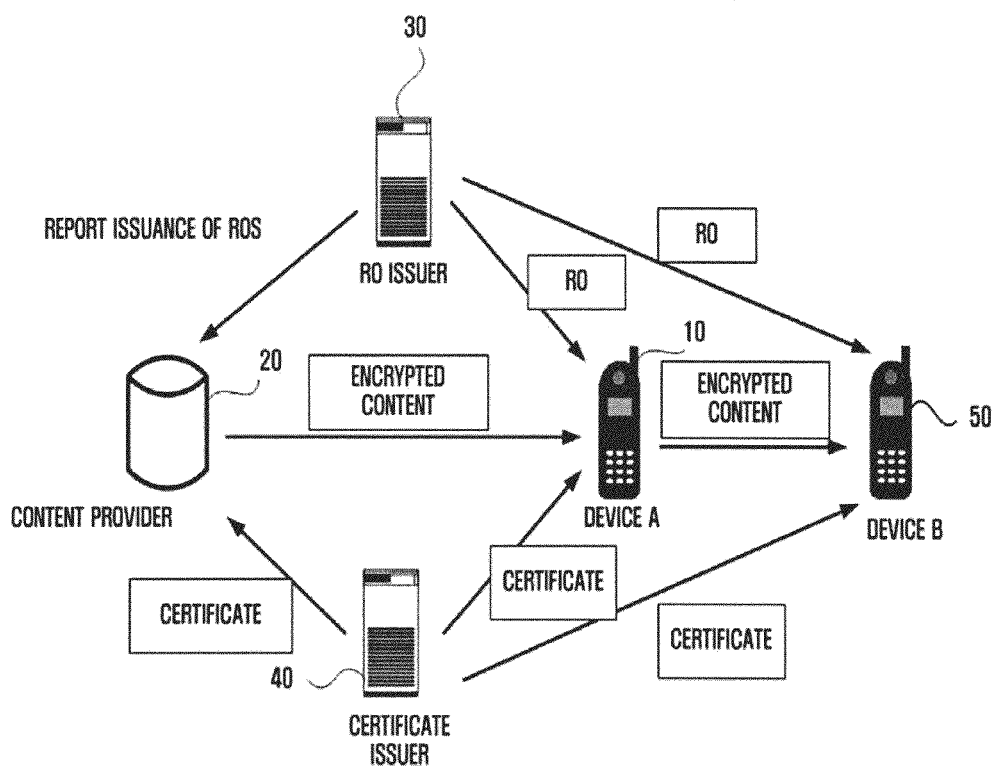
FIG. 1 illustrates the concept of a related art DRM.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Like reference numerals in the drawings denote like elements, and thus their description will be omitted.

For a better understanding of the exemplary embodiments of the present invention, the definitions of the terms frequently used in this disclosure will be given below.

Secure Removable Medium (SRM)

An SRM is a type of portable storage device such as a nonvolatile memory (e.g., a flash memory) which is readable, writable, and erasable. An SRM is a storage device that can be connected to a device. Examples of an SRM include, but are not limited to, a Smart Media (SM) card, a memory stick, a Compact Flash (CF) card, an eXtreme Digital (XD) card, or a multimedia card.

Rights Object (RO)

An RO is a type of license which grants a user the right to use encrypted content and information regarding restrictions imposed on the use of the encrypted content. A detailed description of an RO is presented in Open Mobile Alliance (OMA) DRM Enabler v1.0, 2002, Open Mobile Alliance or OMA DRM v2.0 draft, 2004, Open Mobile Alliance.

Figure 2:
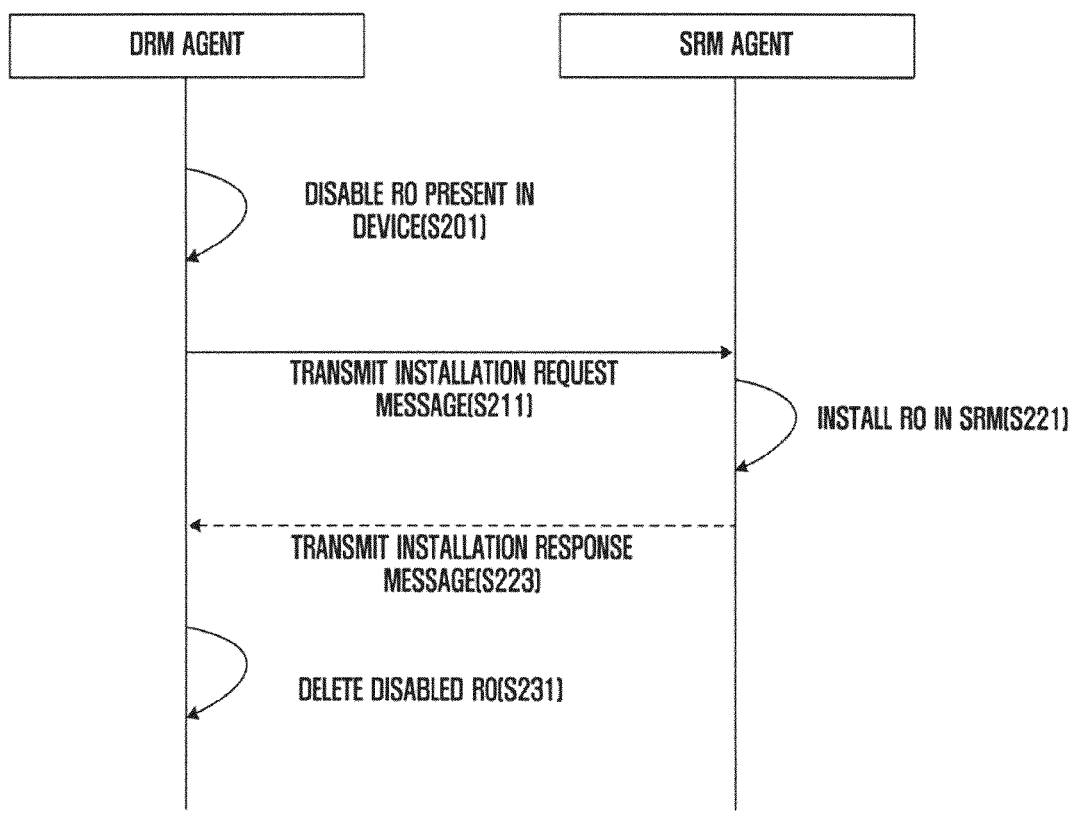
FIG. 2 illustrates the installation of an RO present in a device in a secure removable medium (SRM), according to an exemplary embodiment of the present invention.

FIG. 2 illustrates the installation of an RO present in a device in an SRM, according to an exemplary embodiment of the present invention. An RO may be transferred from a device to an SRM.

Referring to FIG. 2, in operation S201, a Digital Rights Management (DRM) agent disables an RO present in a device before the installation of the RO in an SRM.

In operation S211, the DRM agent transmits an installation request message to an SRM agent.

In operation S211, the SRM agent receives the installation request message and an RO (particularly, a copy of the RO present in the device) from the DRM agent and installs the RO in the SRM in operation S221. The disabled RO still remains in the device.

In operation S223, the SRM agent transmits an installation response message regarding the result of the installation to the DRM agent.

In operation S231, if the installation of the RO in the SRM has been successfully completed, the DRM agent deletes the disabled RO still remaining in the device.

Operations S201 through S231 will hereinafter be described in further detail.

For operation S201, an RO must satisfy the following conditions: first, an RO must be able to be disabled by the DRM agent; second, a disabled RO may not be used any longer for the access of DRM content; third, a disabled RO may be removed from the device by the DRM agent; and fourth, a disabled RO may be enabled so that it can become the same as a corresponding original RO.

In operation S211, once an RO is disabled, the DRM agent transmits an installation request message to the SRM agent. Parameters of the installation request message may be as indicated in Table 1 below. Parameters defined in Tables 1 through 35 are exemplary, and thus, the exemplary embodiments of the present invention are not restricted thereto.

TABLE 1

| Parameters | Protection Requirements | Descriptions |
| --- | --- | --- |
| RO | Integrity & Confidentiality | RO |
| ESF | Integrity | State Information |
| RID | Integrity | RO Identifier (ID) |
| LCID | Integrity | Content ID List |

In operation S221, the SRM agent receives the installation request message transmitted by the DRM agent and installs the RO in the SRM. For this, the SRM agent verifies the RO, which is encrypted, and the integrity of parameters 'RO', 'ESF', 'RID', and 'LCID' of the installation request message. Then, the SRM agent allocates an empty RO slot and stores the parameters 'RO', 'ESF', 'RID', and 'LCID' of the installation request message, i.e., the RO, in the empty RO slot. Here, the parameters 'ESF' and 'RO' may be interpreted as being an RO.

Once an RO is installed in the device, the RO must be able to be disabled by a DRM agent, and must also be able to be locked for the use of DRG content so that the RO can be prevented from being used by other applications.

In operation S223, the SRM agent transmits an installation response message regarding the result of the installation performed in operation S221 to the DRM agent. If an error has occurred during the installation performed in operation S221, the SRM agent may report an installation response message identifying the type of the error to the DRM agent. A parameter of the installation response message may be as indicated in Table 2 below.

TABLE 2

| Parameters | Protection Requirements | Descriptions |
| --- | --- | --- |
| Error Code | Integrity | Various error cases that may occur during installation of RO in SRM |

Referring to Table 2, a parameter 'Error Code' may be used to describe a variety of errors as defined in Table 3 below.

TABLE 3

| Errors | Descriptions |
| --- | --- |
| No Error | Situation when RO has been successfully installed in SRM |
| Not Enough Space | Situation when SRM falls short of storage space and thus cannot store RO therein |
| Parameter Integrity Verification Failed | Situation when HMAC value of parameter included in installation request message and HMAC value of parameter generated by SRM agent do not match |
| Parameter Decryption Failed | Situation when SRM agent fails to decrypt encrypted parameter |

After operation S223, the DRM agent receives the installation response message transmitted by the SRM agent, and verifies the integrity of the parameter 'Error Code' of the installation response message.

In operation S231, if the installation response message transmitted by the SRM agent indicates that the installation of the RO in the SRM has been successfully completed, i.e., if the parameter 'Error Code' corresponds to the message 'No Error', the DRM agent deletes the disabled RO still remaining in the device.

Figure 3:
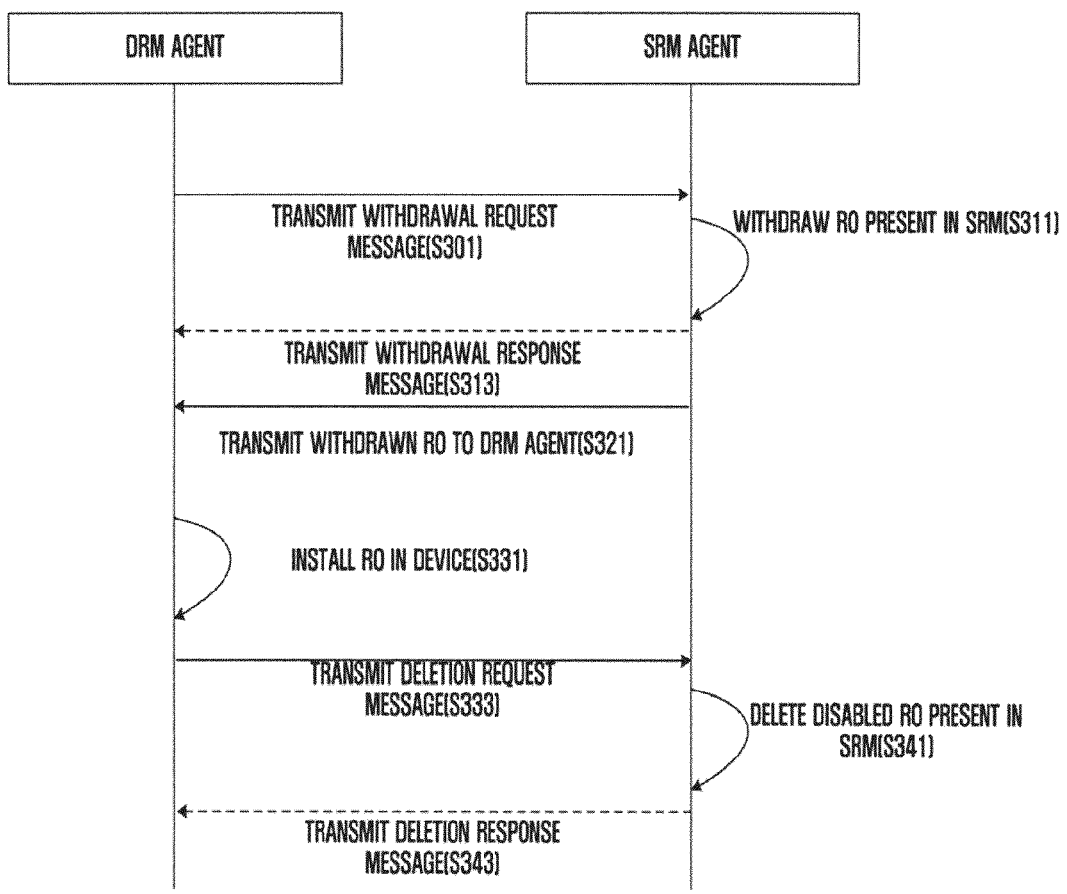
FIG. 3 illustrates the withdrawal of an RO from an SRM and the transfer of the RO to a device, according to an exemplary embodiment of the present invention.

FIG. 3 illustrates the withdrawal of an RO from an SRM and the transfer of the RO to a device, according to an exemplary embodiment of the present invention. An RO can be transferred from an SRM to a device.

Referring to FIG. 3, in operation S301, a DRM agent in a device transmits a withdrawal request message to an SRM agent in order to withdraw an RO from an SRM and install the RO in the device.

In operation S311, the SRM agent receives the withdrawal request message transmitted by the DRM agent and withdraws an RO from the SRM. The SRM agent disables the withdrawn RO. The disabled RO remains in the SRM agent after the transmission of a copy of the withdrawn RO to the DRM agent.

In operation S313, the SRM agent transmits to the DRM agent a withdrawal response message indicating that an RO has been withdrawn from the SRM and that the RO has been disabled.

In operation S321, the SRM agent transmits a copy of the RO to the DRM agent. Operations S313 and S321 may be performed at the same time.

In operation S331, the DRM agent installs the RO transmitted by the SRM agent in the device. In operation S333, the DRM agent transmits to the SRM agent a deletion request message that requests the deletion of the RO still remaining in the SRM.

In operation S341, the SRM agent deletes the RO still remaining in the SRM in response to the deletion request message transmitted by the DRM agent.

In operation S343, the SRM agent transmits a deletion response message regarding the result of the deletion performed in operation S341 to the DRM agent.

Operations S301 through S343 will hereinafter be described in further detail.

Parameters of the withdrawal request message transmitted from the DRM agent to the SRM agent in operation S301 may be as indicated in Table 4 below.

TABLE 4

| Parameters | Protection Requirements | Descriptions |
|---|---|---|
| RID | Integrity | RO ID |
| Read Data Flag | Integrity | 00h: RO is disabled after being withdrawn<br>01h: RO maintains disabled even after being withdrawn<br>For withdrawal of RO, 'Read Data Flag' may have value of '00h'. |

The SRM agent that receives the withdrawal request message performs the following operations: first, the SRM agent verifies the integrity of the parameters of the withdrawal request message; second, the SRM agent searches for an RO slot having an RO corresponding to an RO ID included in the withdrawal request message; and third and finally, the SRM agent withdraws an RO and state information 'ESF' regarding the RO from the identified RO slot.

The read data flag of the withdrawal request message may have a value of 00h.

After the withdrawal of the RO and the state information 'ESF' regarding the RO from the SRM, the original RO present in the identified RO slot is disabled. A disabled RO must satisfy the following conditions: first, a disabled RO must be able to be enabled by a DRM agent that has produced the disabled RO; second, a disabled RO must not be able to be withdrawn by DRM agents, other than a DRM agent that has produced the disabled RO; third, a disabled RO must not be able to be enabled by DRM agents, other than a DRM agent that has produced the disabled RO; fourth, a disabled RO must not be able to be locked for the use of DRM content; fifth, a disabled RO must be able to be deleted by a DRM agent that has produced the disabled RO; and sixth, a disabled RO may be enabled so that it can become the same as a corresponding original RO present in an RO slot.

In operations S311 and S313, the SRM agent withdraws an RO present in an SRM, disables the RO, and transmits a withdrawal response message regarding the result of the withdrawal. Parameters of the withdrawal response message may be as indicated in Table 5 below.

TABLE 5

| Parameters | Protection Requirements | Descriptions |
|---|---|---|
| RO | Integrity & Confidentiality | RO |
| ESF | Integrity | State Information |
| Error Code | Integrity | Various errors that may occur during the withdrawal of RO from SRM and during the disablement of RO |

If an error occurs during the withdrawal of an RO by the SRM agent, a withdrawal response message identifying the type of error must be reported to the DRM agent. A parameter 'Error Code' of a withdrawal response message may be set to various values so as to describe various errors, as indicated in Table 6 below.

TABLE 6

| Errors | Descriptions |
|---|---|
| No Error | Situation when RO present in SRM has been successfully withdrawn |

TABLE 6-continued

| Errors | Descriptions |
|---|---|
| No Rights Found | Situation when SRM agent fails to find RO |
| Parameter Integrity Verification Failed | Situation when HMAC value of parameter included in withdrawal request message and HMAC value of parameter generated by SRM agent do not match |
| Rights Already Disabled or Locked | Situation when RO has already been disabled or locked |

Thereafter, the DRM agent receives a withdrawal response message transmitted by the SRM agent, decrypts an encrypted RO included in the received withdrawal response message, and verifies the integrity of the parameter of the received withdrawal response message.

In operation S321, the SRM agent transmits an RO to the DRM agent.

In operation S331, the DRM agent installs the RO transmitted by the SRM agent in the device. Once an RO and state information 'ESF' regarding the RO are successfully withdrawn from the SRM agent, the DRM agent installs the RO in the device. Once the RO is installed in the device, the RO can be used to access DRM content.

In operation S333, the DRM agent transmits a deletion request message to the SRM agent so that a disabled RO present in the SRM can be deleted. A parameter of the deletion request message may be as indicated in Table 7 below.

TABLE 7

| Parameters | Protection Requirements | Descriptions |
|---|---|---|
| RID | Integrity | RO ID |

In operation S341, the SRM agent receives the deletion request message transmitted by the DRM agent and deletes the disabled RO present in the SRM. More specifically, the SRM agent receives the deletion request message transmitted by the DRM agent and deletes the disabled RO present in the SRM, searches for an RO slot having an RO corresponding to an RO ID included in the received deletion request message, and deletes an RO included in the identified RO slot. After the deletion of the RO included in the identified RO slot, the identified RO slot is released. The SRM agent simply deletes a disabled RO.

In operation S343, the SRM agent transmits a deletion response message regarding the result of the deletion performed in operation S341 to the DRM agent. A parameter of the deletion response message may be as indicated in Table 8 below.

TABLE 8

| Parameters | Protection Requirements | Descriptions |
|---|---|---|
| Error Code | Integrity | Various errors that may occur during deletion of RO present in SRM |

Referring to Table 8, a parameter 'Error Code' may be used to describe various errors that may occur during the deletion performed in operation S341, as indicated in Table 9 below.

TABLE 9

| Errors | Descriptions |
| --- | --- |
| No Error | Situation when RO present in SRM has been successfully deleted |
| Parameter Integrity Verification Failed | Situation when HMAC value of parameter included in deletion request message and HMAC value of parameter generated by SRM agent do not match |
| No Rights Found | Situation when RO slot corresponding to RO ID does not exist |
| Invalid DRM Agent | Situation when deletion request message has been transmitted by invalid DRM agent that has not disabled any RO |
| Rights in Enabled State | Situation when RO is in 'enable' state and thus cannot be deleted |

Thereafter, the DRM agent receives the deletion response message transmitted by the SRM agent and verifies the integrity of the parameter of the received deletion response message.

Figure 4:
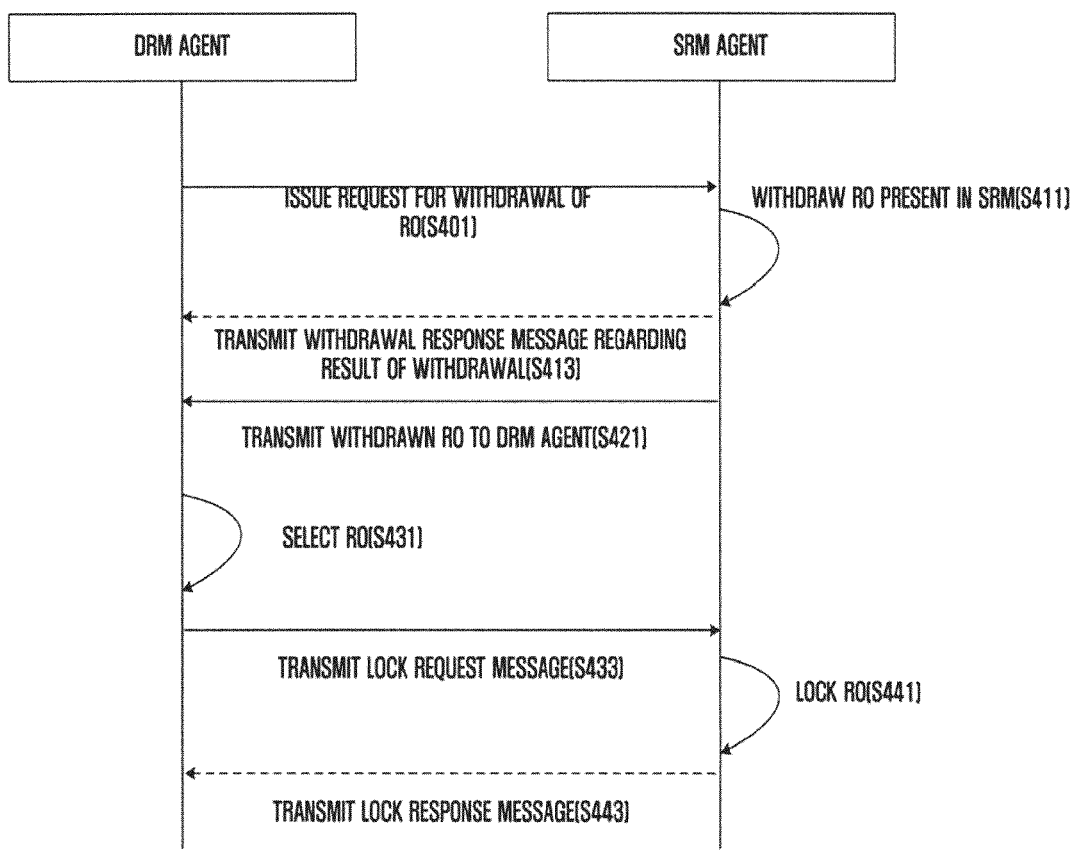
FIG. 4 illustrates the utilization of an RO, according to an exemplary embodiment of the present invention.

FIG. 4 illustrates the consumption of an RO according to an exemplary embodiment of the present invention. Referring to FIG. 4, a DRM agent may collect an RO regarding DRM content from an SRM in order to use the DRM content. In operation S401, the DRM agent issues a request for withdrawal of an RO to the SRM agent by transmitting a withdrawal request message to the SRM agent.

In operation S411, the SRM agent receives the withdrawal request message transmitted by the DRM agent and withdraws an RO from the SRM. If more than one RO regarding DRM content is present in the SRM, the DRM agent may perform multiple RO withdrawal operations.

In operation S413, the SRM agent transmits a withdrawal response message regarding the result of the withdrawal performed in operation S411 to the DRM agent.

In operation S421, the SRM agent transmits the withdrawn RO (or more particularly, a copy of the withdrawn RO) to the DRM agent. Operations S413 and S421 may be performed at the same time.

In operation S431, the DRM agent selects one of a plurality of ROs present in the device or in the SRM.

In operation S433, the DRM agent transmits to the SRM agent a lock request message requesting an RO present in the SRM to be locked in order to prevent the corresponding RO from being utilized by other DRM agents.

In operation S441, the SRM agent receives the lock request message transmitted by the DRM agent and locks an RO in the SRM.

In operation S443, the SRM agent transmits a lock response message regarding the result of the lock request performed in operation S441 to the DRM agent.

Operations S401 through S443 will hereinafter be described in further detail.

Parameters of the withdrawal request message transmitted in operation S401 may be as indicated in Table 10 below. If more than one RO exists in the SRM, the DRM agent may transmit the withdrawal request message more than one time.

TABLE 10

| Parameters | Protection Requirements | Descriptions |
| --- | --- | --- |
| RID | Integrity | RO ID |
| Read Data Flag | Integrity | 00h: RO is disabled after being withdrawn<br>01h: RO still remains disabled even after being withdrawn |

TABLE 10-continued

| Parameters | Protection Requirements | Descriptions |
| --- | --- | --- |
| | | For initial function, 'Read Data Flag' may have value of 01h. |

The SRM agent receives the withdrawal request message transmitted by the DRM agent and performs the following operations: first, the SRM agent verifies the integrity of the parameters of the withdrawal request message; second, the SRM agent searches for an RO slot having an RO corresponding to an RO ID included in the withdrawal request message; and third and finally, the SRM agent withdraws an RO and state information 'ESF' from the identified RO slot. After the withdrawal of the RO and the state information 'ESF' from the identified RO slot, the RO still remains in the identified RO slot and is not disabled.

In operations S411 and S413, the SRM agent withdraws an RO present in the SRM and transmits a withdrawal response message regarding the result of the withdrawal to the DRM agent. Parameters of the withdrawal response message may be as indicated in Table 11 below.

TABLE 11

| Parameters | Protection Requirement | Descriptions |
| --- | --- | --- |
| RO | Integrity & Confidentiality | RO |
| ESF | Integrity | State Information |
| Error Code | Integrity | Various errors that may occur during withdrawal of RO from SRM and disablement of RO |

If an error occurs during the withdrawal of an RO, the SRM agent must report a withdrawal response message identifying the type of error to the DRM agent. A parameter 'Error Code' shown in Table 11 may be used to describe various errors, as indicated in Table 12 below.

TABLE 12

| Errors | Descriptions |
| --- | --- |
| No Error | Situation when RO present in SRM has been successfully withdrawn |
| No Rights Found | Situation when SRM agent fails to find an RO |
| Parameter Integrity Verification Failed | Situation when HMAC value of parameter included in withdrawal request message and HMAC value of parameter generated by SRM agent do not match |
| Rights Already Disabled or Locked | Situation when RO has already been disabled or locked |

The DRM agent receives a withdrawal response message transmitted by the SRM agent, decrypts an encrypted RO included in the withdrawal response message, and verifies the integrity of the parameter of the withdrawal response message.

In operation S421, the SRM agent transmits an RO to the DRM agent.

In operation S431, if more than one RO exists in the SRM or the device, the DRM agent selects one of the ROs present in the SRM or the device, and the selected RO may be utilized according to the Open Mobile Alliance (OMA) DRM specifications. The DRM agent may select one of the ROs present in the SRM by referencing the RO withdrawn from the SRM. If more than one RO exists in the SRM, the DRM agent may select one of the ROs.

In operation S433, the DRM agent transmits to the SRM agent a lock request message that requests an RO to be locked in order to prevent the RO from being utilized by other DRM agents. A parameter of the lock request message may be as indicated in Table 13 below.

TABLE 13

| Parameters | Protection Requirements | Descriptions |
|---|---|---|
| RID | Integrity | RO ID |

In operation S441, the SRM agent receives the lock request message transmitted by the DRM agent and locks an RO present in the SRM.

In operation S443, the SRM agent transmits a lock response message regarding the result of the locking performed in operation S441 to the DRM agent. If an error occurs during the locking performed in operation S441, the SRM agent must report a lock response message identifying the type of the error to the DRM agent.

A parameter of the lock response message may be as indicated in Table 14 below.

TABLE 14

| Parameters | Protection Requirements | Descriptions |
|---|---|---|
| Error Code | Integrity | Various errors that may occur during locking of RO present in SRM |

A parameter 'Error Code' shown in Table 14 may be used to describe various errors, as indicated in Table 15 below.

TABLE 15

| Errors | Descriptions |
|---|---|
| No Error | Situation when an RO present in SRM has been successfully locked |
| Parameter Integrity Verification Failed | Situation when HMAC value of parameter included in lock request message and HMAC value of parameter generated by SRM agent do not match |
| No Rights Found | Situation when RO slot corresponding to RO ID does not exist |
| Rights Already Disabled or Locked | Situation when RO has already been disabled or locked |

Thereafter, the DRM agent receives the lock response message transmitted by the SRM agent and verifies the integrity of the parameter of the lock response message.

A locked RO must satisfy the following conditions: first, state information 'ESF' regarding a locked RO must be able to be updated only by a DRM agent which has produced the locked RO; second, only state information 'ESF' regarding a locked RO must be able to be updated; third, a DRM agent that has transmitted a lock request message must not be able to modify a locked RO; fourth, a locked RO must be able to be released by a DRM agent that has produced the locked RO; fifth, a locked RO must not be able to be disabled; and sixth and finally, an RO must not be able to be locked in response to multiple lock request messages.

Figure 5:
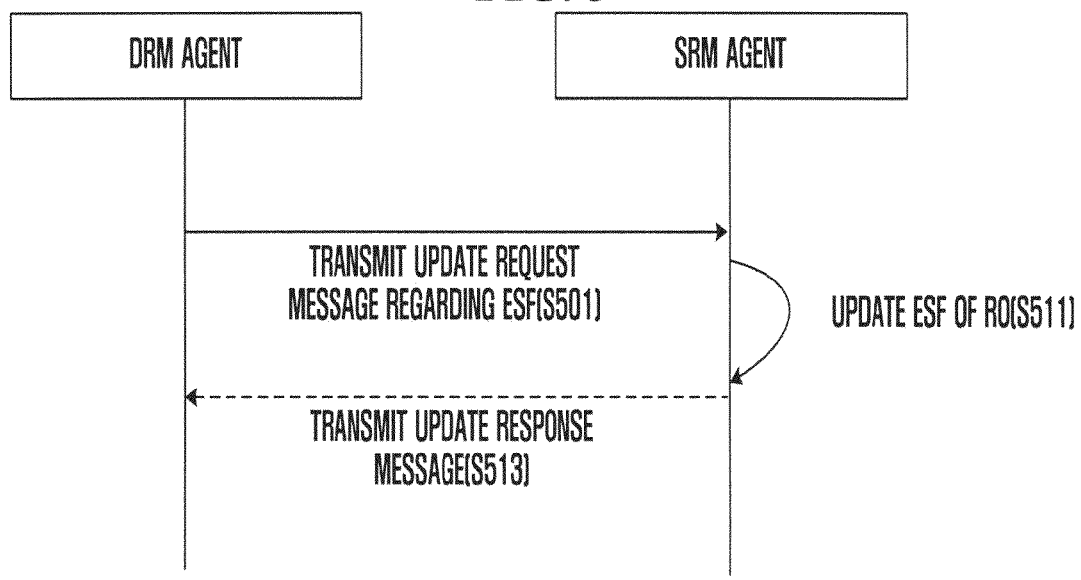
FIG. 5 illustrates the update of an RO present in an SRM, according to an exemplary embodiment of the present invention.

FIG. 5 illustrates the update of an RO present in an SRM according to an exemplary embodiment of the present invention. Referring to FIG. 5, a DRM agent utilizes an RO to access DRM content. The utilization of an RO may be performed differently according to whether or not the RO includes constraints, as specified in OMA DRM 2.0. The constraints may include Count, Timed-Count, Interval, Accumulated, and Date/Time. The constraints 'Count' specifies the number of times that DRM content can be accessed. The constraint 'Timed-Count' specifies a period of time for which DRM content can be used. The constraint 'Interval' specifies a time interval for which rights regarding DRM content can be exercised. If the constraint 'Interval' includes a start element, the consumption of DRM content may be allowed after a predetermined time/date specified by the start element. If the constraint 'Interval includes an end element, the consumption of DRM content may be allowed until a predetermined time/date specified by the end element. The constraint 'Accumulated' specifies a maximum period of time for which rights regarding DRM content can be exercised. If a predetermined amount of time specified by the constraint 'Accumulated' elapses, DRM content cannot be accessed any longer. The constraint 'Date/Time' specifies a predetermined time range for which DRM content can be accessed. The constraint 'Date/Time' includes a start element and/or an end element. More specifically, if the constraint 'Date/Time' includes a start element, DRM content cannot be accessed before a predetermined time/date specified by the start element. If the constraint 'Date/Time' includes an end element, DRM content cannot be accessed after a predetermined time/date specified by the end element.

For an RO with no constraints, the DRM agent does not need to update an RO present in the SRM and uses DRM content.

Referring to FIG. 5, for an RO with constraints, the DRM agent uses DRM content with reference to the constraints during the update of state information 'ESF' regarding the RO. The DRM agent may update state information 'ESF' regarding an RO present in the SRM according to a set of rules, as indicated in Table 16 below.

TABLE 16

| Error Code | Descriptions |
|---|---|
| Count | Update RO present in SRM at beginning of use of DRM content |
| Timed-Count | Update RO present in SRM predetermined time period after use of DRM content DRM where predetermined time period is specified by timer attribute of timed-count constraint |
| Interval | Update RO present in SRM at beginning of use of DRM content |
| | Update RO only one time during first consumption of constraint |
| Accumulated | Repeatedly update SRM present in SRM DRM until end of use of DRM content |
| Date/time | No need to update |
| Unlimited | No need to update |

Referring to FIG. 5, in order to update state information 'ESF' regarding an RO, the DRM agent may generate new state information 'ESF' that will replace the original state information 'ESF' to be updated.

Thereafter, in operation S501, the DRM agent transmits to the SRM agent an update request message that requests state information 'ESF' regarding an RO present in the SRM to be updated. Parameters of the update request message may be as indicated in Table 17 below.

TABLE 17

| Parameters | Protection Requirements | Descriptions |
|---|---|---|
| RID | Integrity | RO ID |
| New ESF | Integrity | New ESF that will replace original ESF |

In operation S511, the SRM agent receives the update request message transmitted by the DRM agent and updates state information 'ESF' regarding an RO. More specifically, the SRM agent searches for an RO slot using an RO ID included in the update request message, and replaces original state information 'ESF' regarding an RO included in the identified RO slot with new state information 'ESF'.

In operation S513, the SRM agent transmits an update response message to the DRM agent. A parameter of the update response message may be as indicated in Table 18 below.

TABLE 18

| Parameters | Protection Requirements | Descriptions |
|---|---|---|
| Error Code | Integrity | Various errors that may occur during update of state information 'ESF' regarding RO present in SRM |

If an error occurs during the update of state information 'ESF' regarding an RO, the SRM agent must report an update response message identifying the type of error to the DRM agent. For this, a parameter 'Error code' shown in Table 18 may be used to describe various errors, as indicated in Table 19 below.

TABLE 19

| Errors | Descriptions |
|---|---|
| No Error | Situation when state information 'ESF' regarding RO present in SRM has been successfully updated |
| Parameter Integrity Verification Failed | Situation when HMAC value of parameter included in update request message and HMAC value of parameter generated by SRM agent do not match |
| No Rights Found | Situation when no RO slot corresponding to RO ID exists |
| Invalid DRM Agent | Situation when update request message has been received from DRM agent that has locked no RO |
| Rights Not Locked | Situation when RO is not locked and thus cannot be updated |
| Unknown Error | Situation when SRM agent fails to update RO |

Thereafter, the DRM agent receives the update response message transmitted by the SRM agent and verifies the integrity of the parameter of the update response message.

Once state information 'ESF' regarding an RO present in the SRM has been successfully updated, the DRM agent updates a copy of the state information 'ESF' present in the device so that the copy of the state information 'ESF' present in the device can be synchronized with the updated state information 'ESF' present in the SRM.

Figure 6:
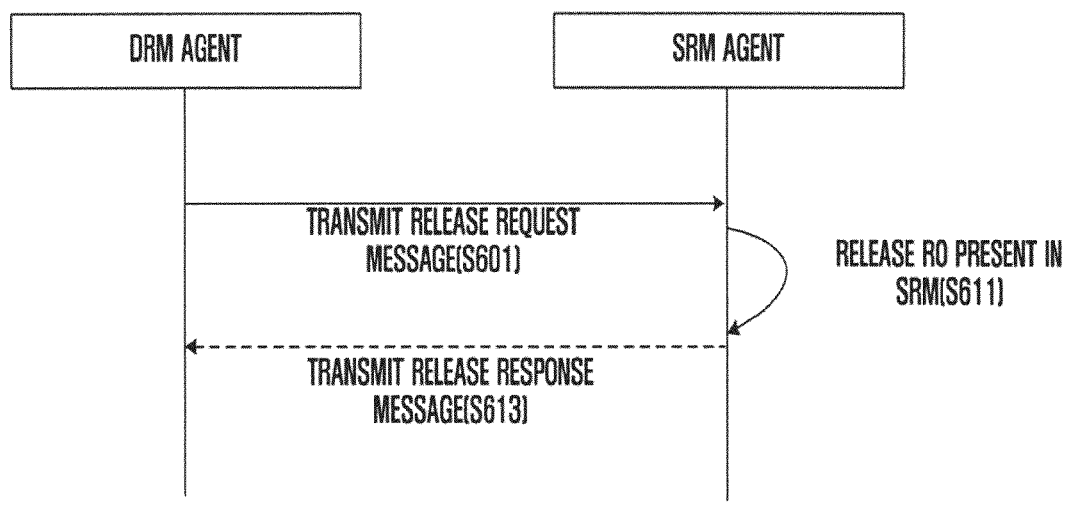
FIG. 6 illustrates the transmission of a release request message to an SRM agent by a DRM agent, according to an exemplary embodiment of the present invention.

FIG. 6 illustrates the transmission of a release request message to an SRM agent by a DRM agent according to an exemplary embodiment of the present invention. Referring to FIG. 6, in operation S601, when the use of DRM content is completed or is terminated by a user, a DRM agent transmits a release request message to an SRM agent in order to release an RO currently being locked. A parameter of the release request message may be as indicated in Table 20 below.

TABLE 20

| Parameters | Protection Requirements | Descriptions |
|---|---|---|
| RID | Integrity | RO ID |

In operation S611, the SRM agent receives the release request message transmitted by the DRM agent and releases an RO present in an SRM. A released RO must satisfy the following conditions: first, a released RO must be able to be locked in response to a request message transmitted by a DRM agent; second, a released RO must be able to be withdrawn in response to a request message transmitted by a DRM agent; and third and finally, a released RO must be able to be disabled in response to a request message transmitted by a DRM agent.

In operation S613, the SRM agent transmits a release response message to the DRM agent. A parameter of the release response message may be as indicated in Table 21 below.

TABLE 21

| Parameters | Protection Requirements | Descriptions |
|---|---|---|
| Error Code | Integrity | Various errors that may occur during release of RO present in SRM |

If an error occurs during the release of an RO, the SRM agent may report a release response message identifying the type of error to the DRM agent. For this, a parameter 'Error Code' shown in Table 21 may be used to describe various errors, as indicated in Table 22 below.

TABLE 22

| Errors | Descriptions |
|---|---|
| No Error | Situation when RO present in SRM has been successfully released |
| Parameter Integrity Verification Failed | Situation when HMAC value of parameter included in release request message and HMAC value of parameter generated by SRM agent do not match |
| No Rights Found | Situation when no RO slot corresponding to RO ID exists |
| Invalid DRM Agent | Situation when update request message has been received from DRM agent that has locked no RO |
| Rights Not Locked | Situation when RO is not locked and thus cannot be released |
| Unknown Error | Situation when SRM agent fails to release RO |

Thereafter, the DRM agent receives a release response message transmitted by the SRM agent, verifies the integrity of the parameter of the release response message, and deletes an image of an RO present in the device.

Thereafter, the update of an RO present in the SRM for the utilization of a local RO is terminated. The DRM agent cannot issue a request for update of a released RO to the SRM agent.

Exception handling will hereinafter be described in detail.

During the transmission of messages between a DRM agent and an SRM agent, various exceptional circumstances may occur. First, the DRM agent may fail to receive a response message transmitted by the SRM agent. In this case, the physical connection between a device and an SRM may be unstable, or the device may not have been connected to the SRM. Second, the DRM agent may detect an error by referencing a parameter 'Error Code' of a response message transmitted by the SRM agent. Third, the DRM agent may fail to verify the integrity of a response message transmitted by the SRM agent. Fourth, the DRM agent may detect an unknown defect from a response message transmitted by the SRM agent.

In order to properly handle the above-described exceptional circumstances, a DRM agent and an SRM agent may record a number of most recent successful operations. A record in a device will hereinafter be referred to as a device trace record, and a record in an SRM will hereinafter be referred to as an SRM trace record.

A DRM agent records a number of most recent successful operations as a device trace record. The format of a device trace record may be as illustrated in FIG. 7.

Elements of a device trace record may be as indicated in Table 23 below.

TABLE 23

| Elements | Variables | Descriptions | Values |
|---|---|---|---|
| SRM ID | srmID(702) | Identifier of SRM on which function is performed by device | srmID has hash value of SRM public key included in SRM certificate (e.g., element 'subjectPublicKeyInfo' encrypted using Distributed Encoding Rules (DER) included in SRM certificate) where default hash algorithm may be SHA-1. |
| RID | roIDLength(704) | Length of RO ID | roIDLength has initial default value of 0. |
|  | byte(706) | Bytes in RO ID, and particularly, identifier of RO subjected to most recent successful step | RO ID |
| Function | functionID(708) | Identifier of function, and particularly, identifier of most recent successful function | functionID has 2-byte string value. More specifically, functionID has initial default value of NN. For transfer of RO from device to SRM, functionID may have value of M1. For transfer of RO from SRM to device, functionID may have value of M2. For error recovery, functionID may have value of ER. |
| Step Index | stepIndex(710) | Index of step, and particularly, index of most recent successful step of function | stepIndex has unsigned integer value. More specifically, if functionID is NN, stepIndex may have default value of 0. If functionID is M1 and RO present in device has been successfully disabled, stepIndex may have value of 1. If functionID is M1 and installation request message has been successful, stepIndex may have value of 2. If functionID is M1 and RO present in device has been successfully deleted, stepIndex may have value of 3. If functionID is M2 and withdrawal request message has been successful, stepIndex may have value of 1. If functionID is M2 and RO has been successfully installed in device, stepIndex may have value of 2. If functionID is M2 and deletion request message has been successful, stepIndex may have value of 3. If functionID is ER and an error regarding deletion of RO present in device has been successfully recovered, stepIndex may have value of 1. If functionID is ER and error regarding enablement of RO |

TABLE 23-continued

| Elements | Variables | Descriptions | Values |
|---|---|---|---|
| | | | present in device has been successfully recovered, stepIndex may have value of 2. If functionID is ER and an error regarding deletion request message has been successfully recovered, stepIndex may have value of 3. If functionID is ER and error regarding enablement request message has been successfully recovered, stepIndex may have value of 4. |

For operations and messages that are not specified in Table 23, a device trace record is not updated. A DRM agent generates a device trace record for an SRM agent connected thereto.

An SRM agent records a number of most recent successful steps as an SRM trace record. The format of an SRM trace record may be as illustrated in FIG. 8.

Elements of an SRM trace record may be as indicated in Table 24 below.

TABLE 24

| Elements | Variables | Descriptions | Values |
|---|---|---|---|
| Device ID | deviceID(802) | Identifier of device on which function is performed by SRM | deviceID has hash value of device public key included in device certificate (e.g., element 'subjectPublicKeyInfo' encrypted using DER included in device certificate) where default hash algorithm may be SHA-1. |
| RID | roIDLength(804) | Length of RO ID | roIDLength has initial default value of 0. |
| | byte(806) | Bytes in RO ID, and particularly, identifier of RO subjected to most recent successful operation | RO ID |
| Function | functionID(808) | Identifier of function, and particularly, identifier of function of most recent successful operation | functionID has 2-byte string value. More specifically, functionID has initial default value of NN. For transfer of RO from device to SRM, functionID may have value of M1. For transfer of RO from SRM to device, functionID may have value of M2. For error recovery, functionID may have value of ER. |
| Step Index | stepIndex(810) | Index of step, and particularly, index of most recent successful operation in function | stepIndex has unsigned integer value. More specifically, if functionID is NN, stepIndex may have default value of 0. If functionID is M1 and RO has been successfully installed in SRM, stepIndex may have value of 2. If functionID is M2 and withdrawal of RO present in SRM or disablement of RO present in SRM has been, stepIndex may have value of 1. If functionID is M2 and RO present in SRM has been successfully deleted, stepIndex may have value of 3. If functionID is M2 and deletion request message has been successful, stepIndex may have value of 3. If functionID is ER and an error regarding deletion of RO present in SRM has been successfully recovered, stepIndex may have value of 3. If functionID is ER and error regarding enablement of RO present in SRM has |

TABLE 24-continued

| Elements | Variables | Descriptions | Values |
|---|---|---|---|
| | | | been successfully recovered, stepIndex may have value of 4. |

For operations and messages that are not specified in Table 24, an SRM trace record is not updated. An SRM agent generates an SRM trace record for a DRM agent connected thereto.

A DRM agent may transmit a record withdrawal request message to an SRM agent in order to withdraw an SRM trace record from an SRM. A parameter of the record withdrawal request message may be as indicated in Table 25 below.

TABLE 25

| Parameters | Protection Requirements | Descriptions |
|---|---|---|
| Device ID | Integrity | deviceID has hash value of device public key included in device certificate (e.g., element 'subjectPublicKeyInfo' encrypted using DER included in device certificate) where default hash algorithm may be SHA-1. |

The SRM agent receives the record withdrawal request message transmitted by the DRM agent and withdraws an SRM trace record corresponding to a device ID included in the record withdrawal request message. Thereafter, the SRM agent transmits a record withdrawal response message regarding the result of the withdrawal to the DRM agent. Parameters of the record withdrawal response message may be as indicated in Table 26 below.

TABLE 26

| Parameters | Protection Requirements | Descriptions |
|---|---|---|
| SRM Trace Record | Integrity | See Table 24 |
| Error Code | Integrity | See Table 27 |

The DRM agent receives the record withdrawal response message transmitted by the SRM agent and compares its own device ID with a device ID included in the withdrawn SRM trace record. If the device ID of the DRM agent and the device ID included in the withdrawn SRM trace record match, the DRM agent may perform function recovery. On the other hand, if the device ID of the DRM agent and the device ID included in the withdrawn SRM trace record do not match, a current trace record withdrawal function is terminated.

A parameter 'Error Code' shown in Table 26 may be used to describe various error cases, as indicated in Table 27 below.

TABLE 27

| Errors | Descriptions |
|---|---|
| No Error | Situation when SRM trace record has been successfully withdrawn |
| Unknown Error | Situation when SRM agent fails to withdraw SRM trace record |

A function recovery operation will hereinafter be described in detail.

For the transfer of an RO from a device to an SRM, a DRM agent may perform a function recovery operation, as indicated in Table 28. In this case, a device trace record and an SRM trace record share the same RO ID and the same function ID.

TABLE 28

| stepIndex in Device Trace Record | stepIndex in SRM Trace Record | Operations |
|---|---|---|
| 1 | Integer value, other than 2 | Device trace record and SRM trace record do not have the same RO ID or function ID. DRM agent enables RO present in device. |
| 1 | 2 | DRM agent enables RO preset in device and issues request for deletion of RO to SRM agent by transmitting deletion request message to SRM. |
| 2 | 2 | DRM agent deletes RO from device. |
| 3 | 2 | No further operation is necessary. |

For the transfer of an RO from an SRM to a device, a DRM agent may perform a function recovery operation, as indicated in Table 29. In this case, a device trace record and an SRM trace record may share the same RO ID and the same function ID.

TABLE 29

| stepIndex in Device Trace Record | stepIndex in SRM Trace Record | Operations |
|---|---|---|
| Integer value, other than 1 and 2 | 1 | stepIndex in device trace record and stepIndex in SRM trace record do not share same RO ID or function ID. DRM agent transmits enablement request message to SRM agent in order to enable RO present in SRM. |
| 1 | 1 | DRM agent transmits enablement request message to SRM agent in order to enable RO present in SRM, and deletes RO from device. |
| 2 | 1 | DRM agent transmits enablement request message to SRM agent in order to enable RO present in SRM, and deletes RO from device. |
| 2 | 3 | stepIndex in device trace record is updated to have integer value of 3. No further operation is necessary. |
| 3 | 3 | No further operation is necessary. |

During the recovery of an error that has occurred during the deletion of an RO from the device, the DRM agent may terminate the installation of an RO if the installation of the RO has already begun and may delete the RO if the RO has already been installed.

During the recovery of an error that has occurred during the enablement of an RO present in the device, the DRM agent may terminate the disablement of an RO if the disablement of the RO has already begun and may enable the RO if the RO has already been disabled. In this case, a device trace record may be updated as indicated in Table 23.

Figure 9:
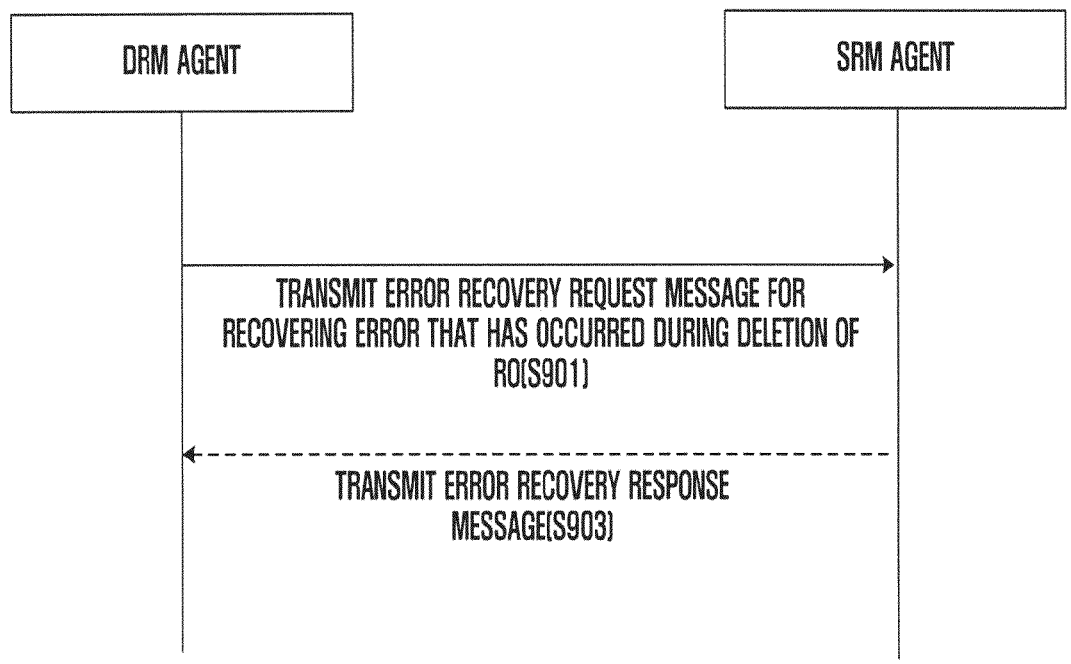
FIGS. 9 and 10 illustrate the transmission of an error recovery request message to an SRM, according to an exemplary embodiment of the present invention.

Referring to FIG. 9, in operation S901, a DRM agent transmits an error recovery request message (i.e., a first request message) to an SRM in order to recover an error that has occurred during the deletion of an RO from the SRM. A parameter of the first request message may be as indicated in Table 30 below.

TABLE 30

| Parameters | Protection Requirements | Descriptions |
|---|---|---|
| RID | Integrity | RO ID |

An SRM agent receives the first request message transmitted by the DRM agent, and deletes an RO present in the SRM.

In operation S903, the SRM agent transmits an error recovery response message for the first request message to the DRM agent. A parameter of the response message may be as indicated in Table 31 below.

TABLE 31

| Parameters | Protection Requirements | Descriptions |
|---|---|---|
| Error Code | Integrity | Various error cases that may occur during deletion of RO from SRM |

A parameter 'Error Code' of Table 31 may be used to describe various errors that may occur during the deletion of an RO, as indicated in Table 32 below.

TABLE 32

| Errors | Descriptions |
|---|---|
| No Error | Situation when error recovery regarding deletion of RO present in SRM has been successfully completed |
| Parameter Integrity Verification Failed | Situation when HMAC value of parameter included in first request message and HMAC value of parameter generated by SRM agent do not match |
| No Rights Found | Situation when no RO slot corresponding to RO ID exists |
| Unknown Error | Situation when SRM fails to recover function |

In short, the SRM agent must perform the following operations upon receiving the first request message transmitted by the DRM agent: first, the SRM agent must terminate the installation of an RO if the installation of the RO has already begun and delete the RO if the RO has already been installed; and second, the SRM agent transmits an error recovery response message for the first request message to the DRM agent.

Figure 10:
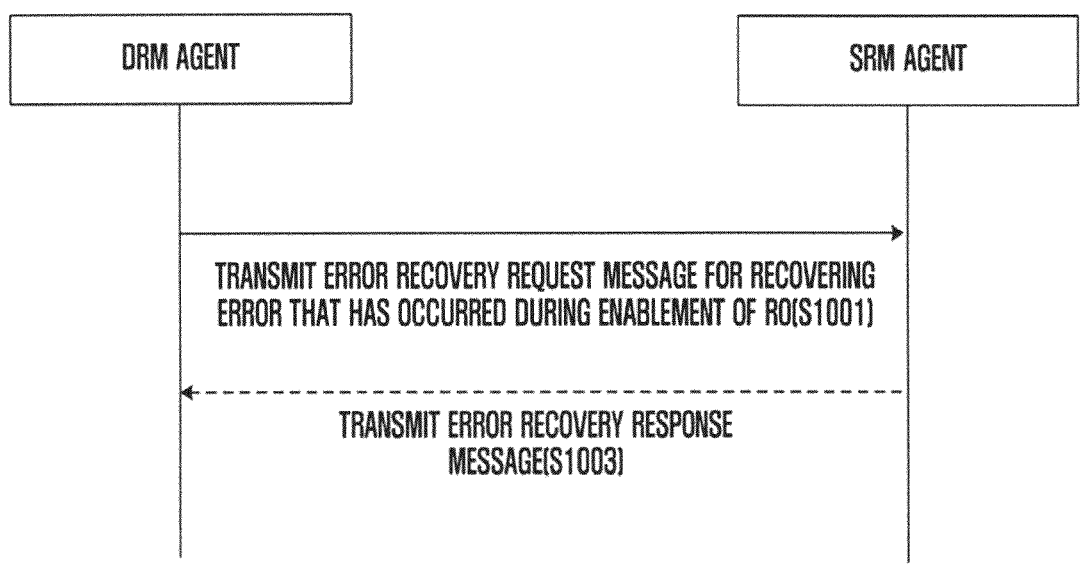

Referring to FIG. 10, in operation S1001, a DRM agent transmits an error recovery request message (i.e., a second request message) to an SRM in order to recover an error that has occurred during the enablement of an RO present in the SRM.

A parameter of the second request message may be as indicated in Table 33 below.

TABLE 33

| Parameters | Protection Requirements | Descriptions |
|---|---|---|
| RID | Integrity | RO ID |

An SRM agent receives the second request message transmitted by the DRM agent and enables an RO present in the SRM.

Thereafter, in operation S1003, the SRM agent transmits an error recovery response message for the second request message to the DRM agent. A parameter of the error recovery response message may be as indicated in Table 34 below.

TABLE 34

| Parameters | Protection Requirements | Descriptions |
|---|---|---|
| Error Code | Integrity | Various error cases that may occur during enablement of RO present in SRM |

A parameter 'Error Code' of Table 34 may be used to describe various errors, as indicated in Table 35 below.

TABLE 35

| Errors | Descriptions |
|---|---|
| No Error | Situation when error recovery in connection with enablement of RO present in SRM has been successfully completed |
| Parameter Integrity Verification Failed | Situation when HMAC value of parameter included in second request message and HMAC value of parameter generated by SRM agent do not match |
| No Rights Found | Situation when no RO slot corresponding RO ID exists |
| Unknown Error | Situation when SRM agent fails to recover function |

In short, the SRM agent must perform the following operations upon receiving the second request message transmitted by the DRM agent: first, the SRM agent must terminate the disablement of an RO if the disablement of the RO has already begun and enable the RO if the RO has already been disabled; and second, the SRM agent transmits an error recovery response message for the second request message to the DRM agent.

Figure 11:
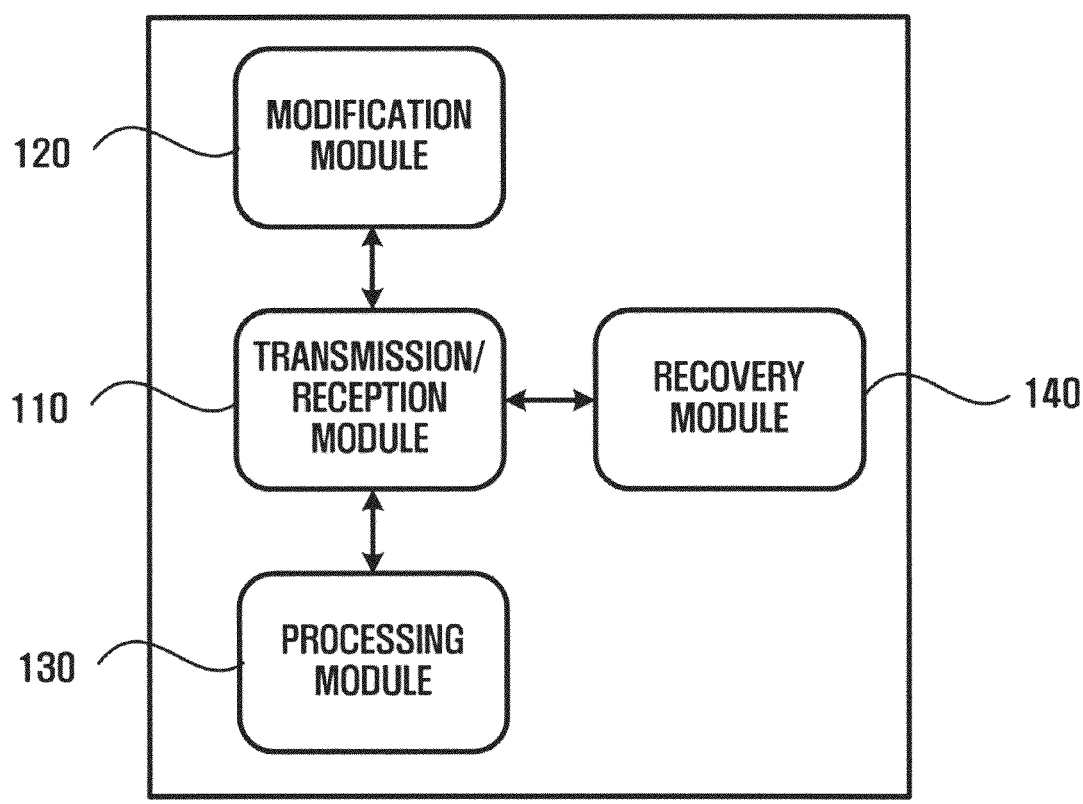
FIG. 11 illustrates a block diagram of a device capable of transferring an RO, according to an exemplary embodiment of the present invention.

FIG. 11 illustrates a block diagram of a device 100 capable of transferring an RO, according to an exemplary embodiment of the present invention. A DRM agent which has been described above may be implemented as an element of the device 100.

The device 100 includes a transmission and reception module 110, a modification module 120, a processing module 130, and a recovery module 140.

The transmission and reception module 110 transmits and receives messages to and from a portable storage device for transferring an RO to be utilized in connection with the access of content. The messages include an installation request message necessary for installing a copy of an original RO present in the device 100 in a portable storage device. The messages also include a withdrawal request message necessary for withdrawing a copy of an original RO from a portable storage device. In addition to an installation request message and a withdrawal request message, the transmission and reception module 110 may also transmit and receive the request messages, response messages, and error recovery-related messages described above with reference to FIGS. 2 through 10.

The modification module 120 modifies the state of an original RO present in the device 100 or deletes the original RO present in the device 100. For example, the modification module 120 may disable an original RO present in the device 100 before transmission of an installation request message for installing a copy of the original RO present in the device 100 in a portable storage device. If a copy of the original RO present in the device 100 has been successfully installed in a portable storage device, the modification module 120 may delete the disabled original RO from the device 100. The operation of the modification module 120 will become more apparent by referencing FIG. 2.

The processing module 130 may transfer an original RO present in the device to a portable storage device. If a copy of an original RO present in a portable storage device is received from the portable storage device in response to a withdrawal request message, the processing module 130 installs the received RO copy in the device 100. If the received copy of the RO has been successfully installed in the device 100, the processing module 130 may transmit a deletion request message to the portable storage device via the transmission and reception module 110 in order to delete the original RO present in the portable storage device. If more than one RO exists in the device 100, the processing module 130 may select one of the ROs present in the device 100 in order to access DRM content. Then, the processing module 130 may transmit a request message to the portable storage device via the transmission and reception module 110 to lock an original RO in the portable storage device corresponding to the selected RO or to release a locked original RO in the portable storage device. Additionally, the processing module 130 transmits an update request message to the portable storage device via the transmission and reception module 110 to update a locked original RO present in the portable storage device or synchronize a copy of an RO present in the device 100 with a corresponding updated original RO present in the portable storage device. The operation of the processing module 130 will become more apparent by referencing FIGS. 2 through 6.

The recovery module 140 recovers an error that has occurred during the transfer of an RO between the device 100 and a portable storage device. More specifically, the recovery module 140 may recover an error with reference to a record regarding a number of most recent successful steps. Additionally, the recovery module 140 may recover an error if IDs included in a record regarding the operation of the device 100 and IDs included in a record regarding the operation of a portable storage device match. The IDs included in the record regarding the operation of the device 100 or the IDs included in the record regarding the operation of the portable storage device may include a device ID and an RO ID. The recovery module 140 may include a record module (not shown) which records information regarding the operation of the device 100.

Figure 12:
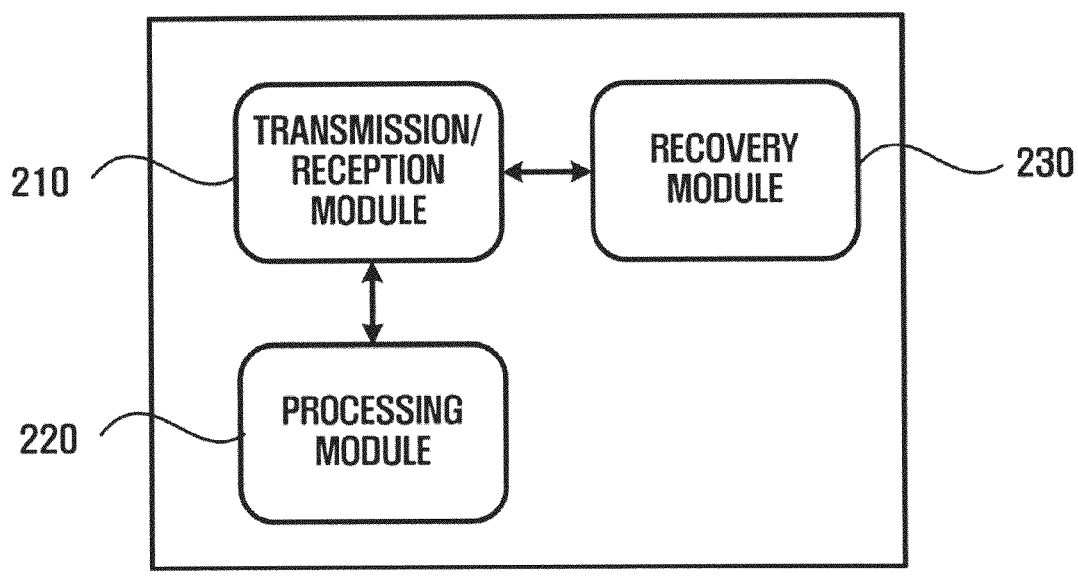
FIG. 12 illustrates a block diagram of a portable storage device capable of transferring an RO, according to an exemplary embodiment of the present invention.

FIG. 12 illustrates a block diagram of a portable storage device 200 capable of transferring an RO, according to an exemplary embodiment of the present invention. An SRM agent which has been described above may be implemented as an element of the portable storage device 200.

Referring to FIG. 12, the portable storage device 200 includes a transmission and reception module 210, a processing module 220, and a recovery module 230.

The transmission and/or reception unit 210 transmits and receives messages to and from a device. The messages include the request messages, response messages, and error recovery-related messages described above with reference to FIGS. 2 through 10.

The processing module 220 performs an operation corresponding to a request message regarding the transfer of an RO to be utilized in connection with the access of content. For example, the processing module 220 receives an RO to be utilized in connection with the access of content from a device and then installs the received RO in the portable storage device 200. The processing module 220 may withdraw a copy of an RO present in the portable storage device 200. The processing module 220 may lock an RO present in the portable storage device 200 or update a locked RO present in the portable storage device 200. The processing module 220 may perform any of the functions described above with reference to FIGS. 2 through 10 according to the type of request message received from a device. For example, if a deletion request message is received from a device, the processing module 220 may delete an RO present in the portable storage device 200. If a release request message is received from a device, the processing module 220 may release a locked RO present in the portable storage device 200.

The recovery module 230 recovers an error that has occurred during the transfer of an RO between a device and the portable storage device 200. The recovery module 230 receives an error recovery-related message from a device, and verifies the integrity of the error recovery-related message. If the integrity of the error recovery-related message is verified, the recovery module 230 may recover an error by comparing a record regarding the operation of a device and a record regarding the operation of the portable storage device 200, and particularly, by referencing a record regarding a number of most recent successful steps. The recovery module 230 may recover an error if IDs included in the record regarding the operation of the device and IDs included in the record regarding the operation of the portable storage device 200 match.

The term 'module', as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

As described above, according to the exemplary embodiments of the present invention, it is possible to guarantee a safe transfer of an RO between a device and a portable storage device.

Additionally, it is possible to properly perform error recovery in consideration of various error cases that may occur during the transfer of an RO between a device and a portable storage device.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of withdrawing a copy of an original rights object (RO) from a portable storage device and transmitting a copy of a disabled original RO to a device, the method comprising:

transmitting a withdrawal request message to the portable storage device;

receiving the copy of the disabled original RO from the portable storage device in response to the withdrawal request message, the disabled original RO being the original RO present in the portable storage, that is disabled in the portable storage device;

installing the copy of the disabled original RO in the device;

transmitting a deletion request message to the portable storage device to delete the disabled original RO from the portable storage device; and receiving a deletion response message regarding the deletion of the disabled original RO from the portable storage device.

2. The method of claim 1, further comprising recovering, by the device, an error that has occurred during a predetermined operation performed between the device and the portable storage device by referencing a record regarding an operation of the portable storage device and a record regarding an operation of the device.

3. The method of claim 2, wherein the recovering the error comprises recovering the error by referencing a record regarding a number of most recent successful operations.

4. The method of claim 2, wherein the recovering the error comprises recovering the error if one or more identifiers included in the record regarding the operation of the device and one or more identifiers included in the record regarding the operation of the portable storage device match.

5. The method of claim 1, further comprising transmitting an error recovery request message to the portable storage device to recover an error that has occurred during a predetermined operation performed between the device and the portable storage device.

6. A method of withdrawing a copy of an original rights object (RO) from a portable storage device and installing a copy of a disabled original RO into a device, the method comprising:

receiving, by the portable storage device, a withdrawal request message regarding an original RO present in the portable storage device from the device;

withdrawing, by the portable storage device, the original RO;

disabling, by the portable storage device, the original RO present in the portable storage, after the original RO is withdrawn;

transmitting, by the portable storage device, the copy of the disabled original RO to the device;

recovering, by the portable storage device, an error that has occurred during a predetermined operation performed between the device and the portable storage device; and if the copy of the disabled original RO has been successfully installed in the device, deleting, by the portable storage device, the disabled original RO.

7. The method of claim 6, wherein the recovering the error, comprises recovering the error by referencing a record regarding a number of most recent successful operations.

8. The method of claim 6, further comprising modifying or deleting a state of the disabled original RO.

9. The method of claim 6, further comprising, if the original RO is locked, releasing, by the portable storage device, the original RO upon request of the device.

* * * * *